(12) United States Patent
Saiki et al.

(10) Patent No.: US 9,444,972 B2
(45) Date of Patent: Sep. 13, 2016

(54) IMAGE FORMING AND PROCESSING APPARATUS, AND METHOD FOR CORRECTING IMAGE DATA BASED ON AN ESTIMATED INTENSITY OF GHOST LIGHT

(71) Applicant: CANON KABUSHIKI KAISHA, Tokyo (JP)

(72) Inventors: Tomoyuki Saiki, Tokyo (JP); Takeyoshi Saiga, Tokyo (JP); Yu Miyajima, Utsunomiya (JP); Shimpei Matsuo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/549,775

(22) Filed: Nov. 21, 2014

(65) Prior Publication Data

US 2015/0160580 A1    Jun. 11, 2015

(30) Foreign Application Priority Data

Dec. 6, 2013   (JP) .................. 2013-253611

(51) Int. Cl.
| | | |
|---|---|---|
| *H04N 1/407* | (2006.01) | |
| *G06K 15/02* | (2006.01) | |
| *G03G 15/043* | (2006.01) | |
| *H04N 1/29* | (2006.01) | |
| *G06K 15/14* | (2006.01) | |

(52) U.S. Cl.
CPC ............ *H04N 1/407* (2013.01); *G03G 15/043* (2013.01); *G06K 15/1825* (2013.01); *G06K 15/14* (2013.01); *H04N 1/29* (2013.01)

(58) Field of Classification Search
None
See application file for complete search history.

(56) References Cited

U.S. PATENT DOCUMENTS

| | | | |
|---|---|---|---|
| 6,021,300 A * | 2/2000 | Jeong ................ | G03G 15/169 399/296 |
| 7,119,826 B2 | 10/2006 | Nojima et al. | |
| 7,929,177 B2 * | 4/2011 | Inoue ................. | G06K 15/1209 347/118 |
| 8,023,205 B2 | 9/2011 | Yamamura | |
| 8,208,172 B2 | 6/2012 | Takayama et al. | |
| 8,724,033 B2 * | 5/2014 | Toyooka .............. | H04N 9/3105 348/725 |
| 8,849,134 B2 | 9/2014 | Ogawa et al. | |
| 8,922,863 B2 * | 12/2014 | Tokita ................. | G02B 26/123 347/243 |
| 2004/0189786 A1* | 9/2004 | Yamakawa ............ | B41J 2/451 347/224 |
| 2010/0202059 A1 | 8/2010 | Yamamura | |
| 2013/0293913 A1 | 11/2013 | Takayama et al. | |
| 2013/0308166 A1 | 11/2013 | Uchidate et al. | |
| 2015/0160581 A1* | 6/2015 | Saiki .................. | G03G 15/0409 399/51 |

FOREIGN PATENT DOCUMENTS

| | | |
|---|---|---|
| JP | H09-118040 A | 5/1997 |
| JP | 2001-205845 A | 7/2001 |
| JP | 2003-072142 A | 3/2003 |
| JP | 2004-188845 A | 7/2004 |
| JP | 2006-255976 A | 9/2006 |
| JP | 2011-005804 A | 1/2011 |

\* cited by examiner

*Primary Examiner* — Scott A Rogers

(74) *Attorney, Agent, or Firm* — Fitzpatrick, Cella, Harper & Scinto

(57) ABSTRACT

An image forming apparatus includes an exposure unit, including a plurality of light-emitting units that correspond to a respective plurality of pixels and a lens array optical system, for emitting exposure light. A photosensitive member is exposed by the exposure light from the exposure unit. A correcting unit estimates, from image data, an intensity of ghost light at a position of each pixel on the photosensitive member in a case when the photosensitive member is exposed by the exposure unit, using the image data, and corrects the image data based on the estimated intensity of the ghost light.

11 Claims, 19 Drawing Sheets

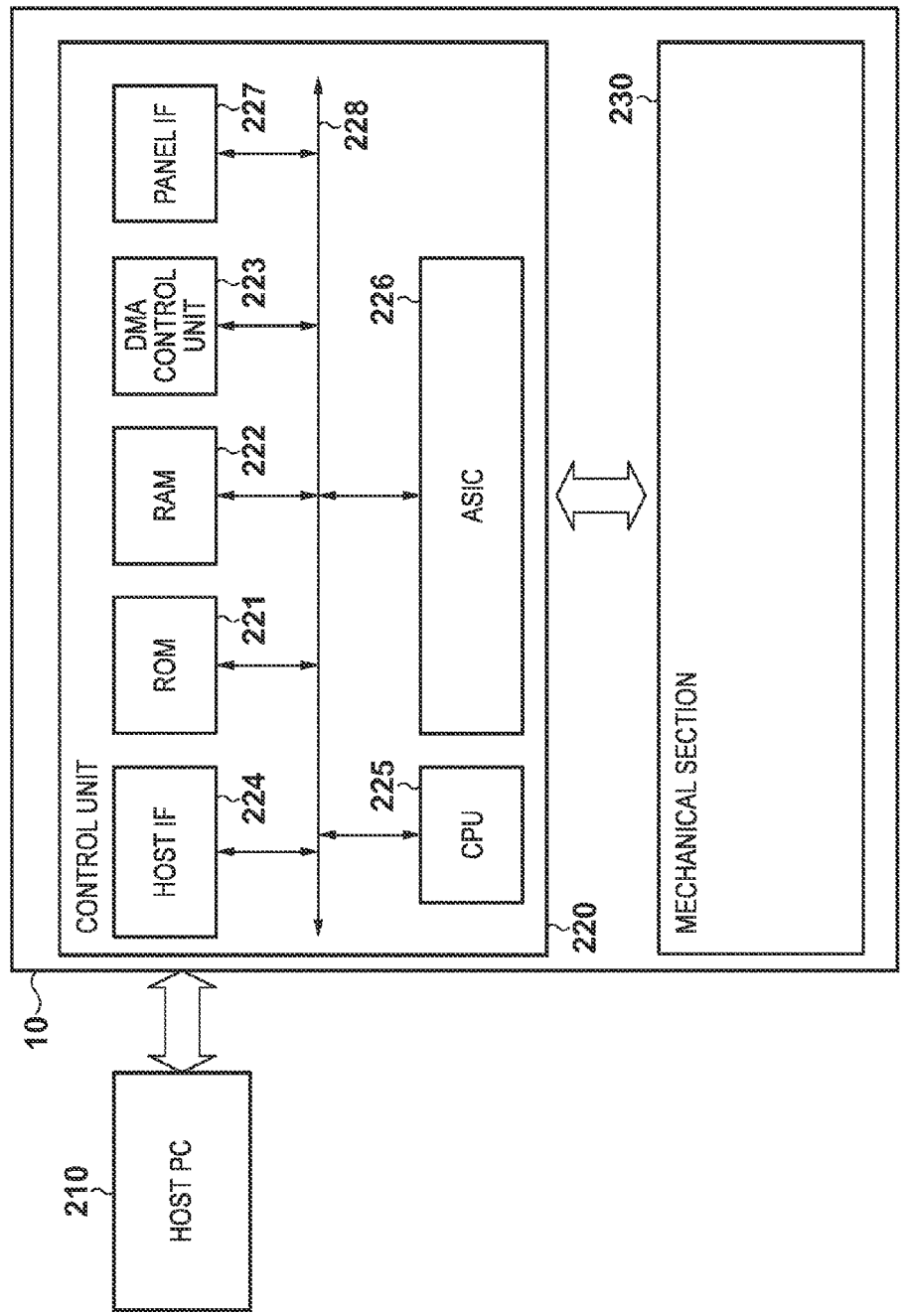

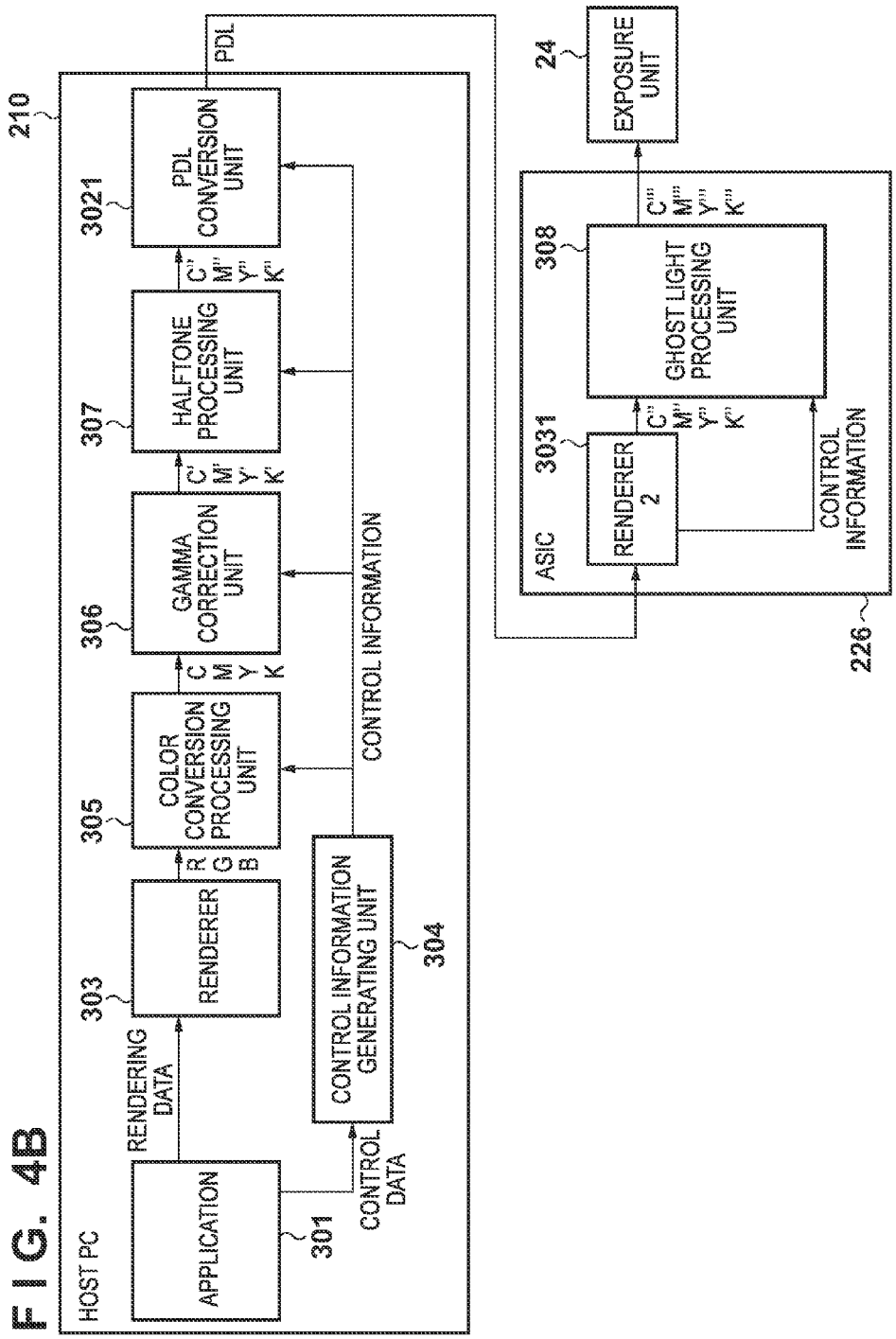

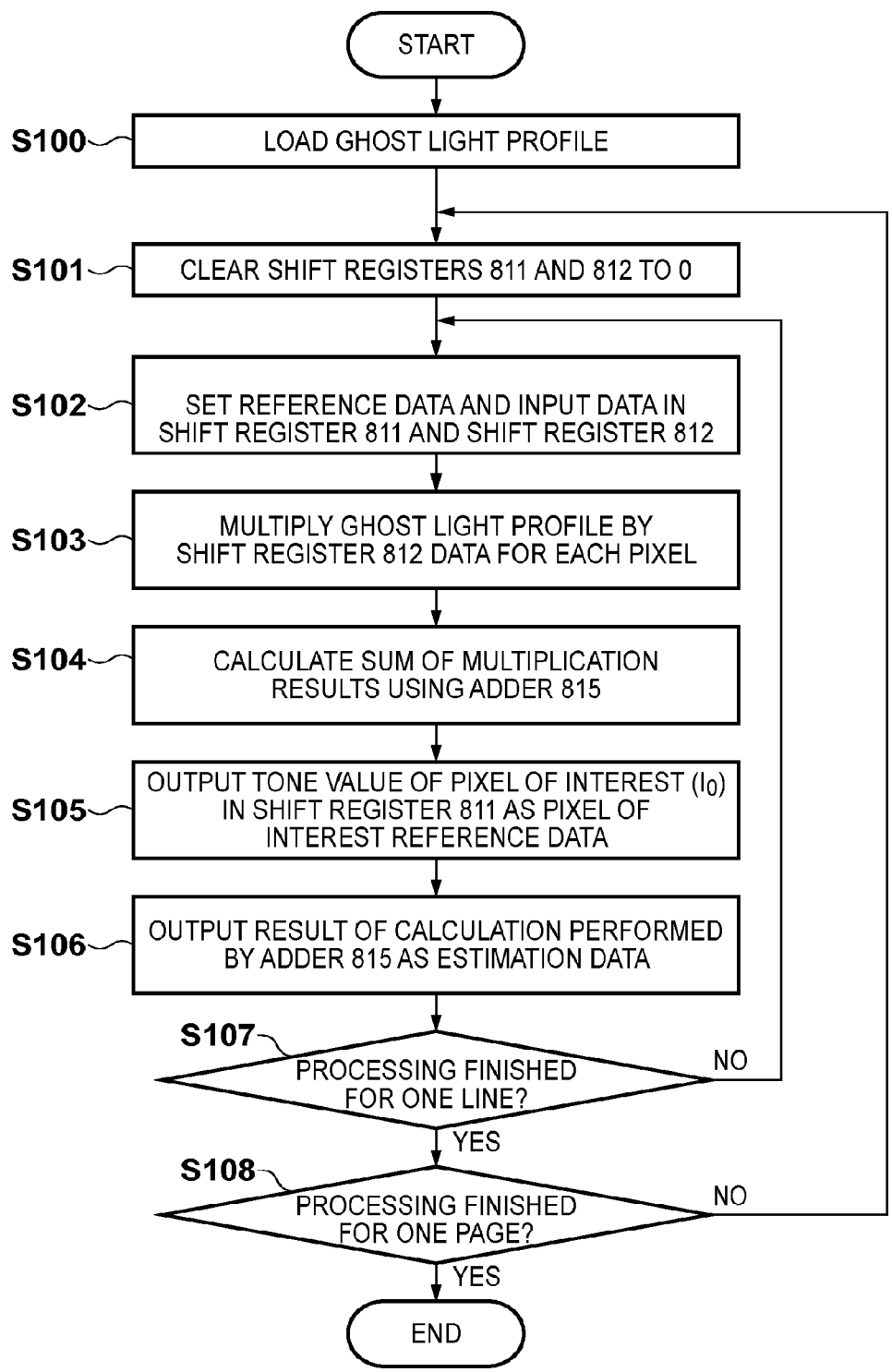

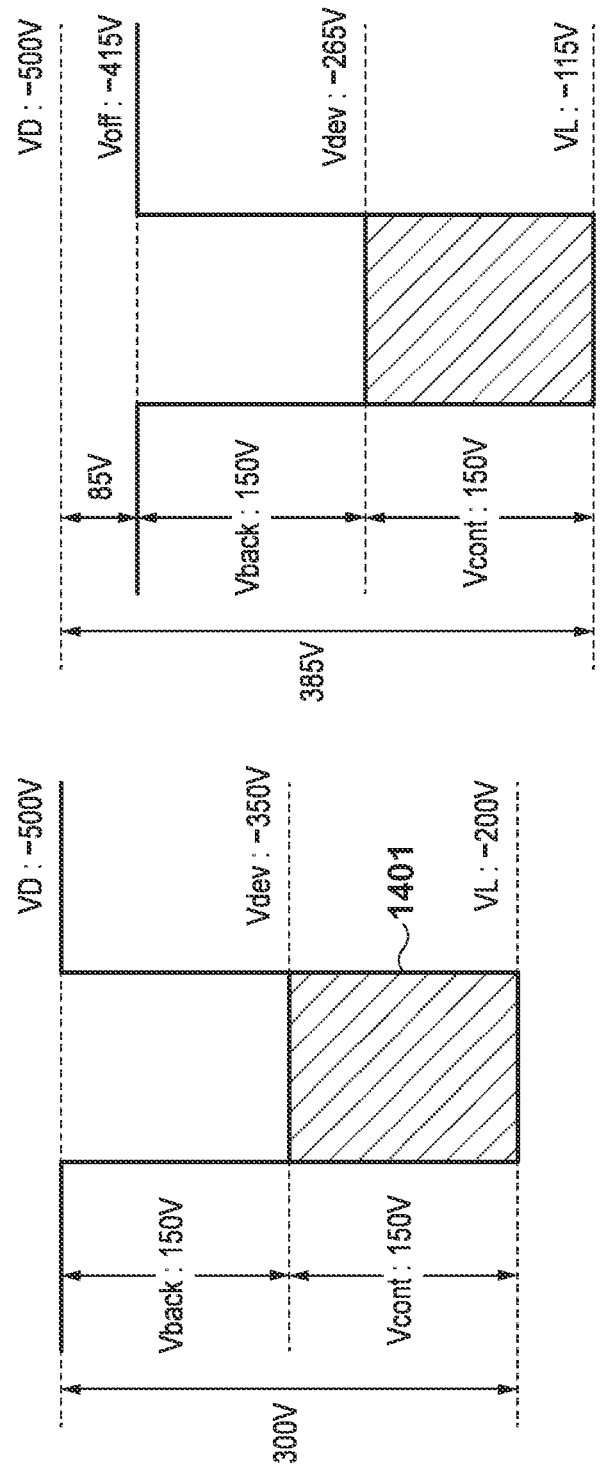

IMAGE FORMING AND PROCESSING APPARATUS, AND METHOD FOR CORRECTING IMAGE DATA BASED ON AN ESTIMATED INTENSITY OF GHOST LIGHT

CLAIM OF PRIORITY

This application claims the benefit of Japanese Patent Application No. 2013-253611, filed on Dec. 6, 2013, which is hereby incorporated by reference herein in its entirety.

BACKGROUND OF THE INVENTION

1. Field of the Invention

The present disclosure relates to image processing techniques used in image forming apparatuses that include lens array optical systems.

2. Description of the Related Art

An image forming apparatus that exposes a photosensitive member using an exposure unit that employs a lens array optical system having a lens array has been developed. The exposure unit that employs the lens array optical system is small in size and contains few components, which is useful in making the image forming apparatus smaller and cheaper. However, with a lens array optical system, unnecessary ghost light is produced in addition to a light flux for forming a desired image on an image surface (in an image forming apparatus, the surface of the photosensitive member). A configuration that reduces such ghost light by disposing a light-blocking member between lens plates that configure the lens array optical system is known. However, in this configuration, light is scattered and reflected by the light-blocking member, and thus, ghost light is produced here as well. Japanese Patent Laid-Open No. 9-118040 discloses a configuration that provides non-planarities in the surface of a light-blocking member, which suppresses ghost light from being scattered and reflected by the light-blocking member, and traveling toward the image surface.

However, the configuration disclosed in Japanese Patent Laid-Open No. 9-118040 complicates the shape and increases the size of the light-blocking member, and, as such, further measures are needed from the standpoint of manufacturing, size, and so on.

SUMMARY OF THE INVENTION

According to an aspect of the present invention, an image forming apparatus includes an exposure unit including a plurality of light-emitting units that correspond to a respective plurality of pixels and a lens array optical system, a photosensitive member exposed by the exposure unit, and a correcting unit configured to estimate, from image data, an intensity of ghost light at a position of each pixel on the photosensitive member in a case when the photosensitive member is exposed by the exposure unit using the image data, and correct the image data based on the estimated intensity of the ghost light.

Further features of the present invention will become apparent from the following description of exemplary embodiments with reference to the attached drawings.

BRIEF DESCRIPTION OF THE DRAWINGS

FIG. 3 is block diagram illustrating the system configuration of an image forming apparatus according to an embodiment.

FIGS. 4A and 4B are block diagrams illustrating a control unit according to an embodiment.

FIG. 7 is a flowchart illustrating a processing performed by a ghost light intensity estimating unit according to an embodiment.

FIGS. 12A and 12B are diagrams illustrating an image forming bias according to an embodiment.

DESCRIPTION OF THE EMBODIMENTS

Hereafter, exemplary embodiments of the present invention will be described with reference to the drawings. Note that constituent elements not necessary for the descriptions of the embodiments have been omitted from the drawings. Note also that the following embodiments are to be taken as examples only, and the content of the embodiments is not intended to limit the scope of the present invention.

First Embodiment

Figure 1:
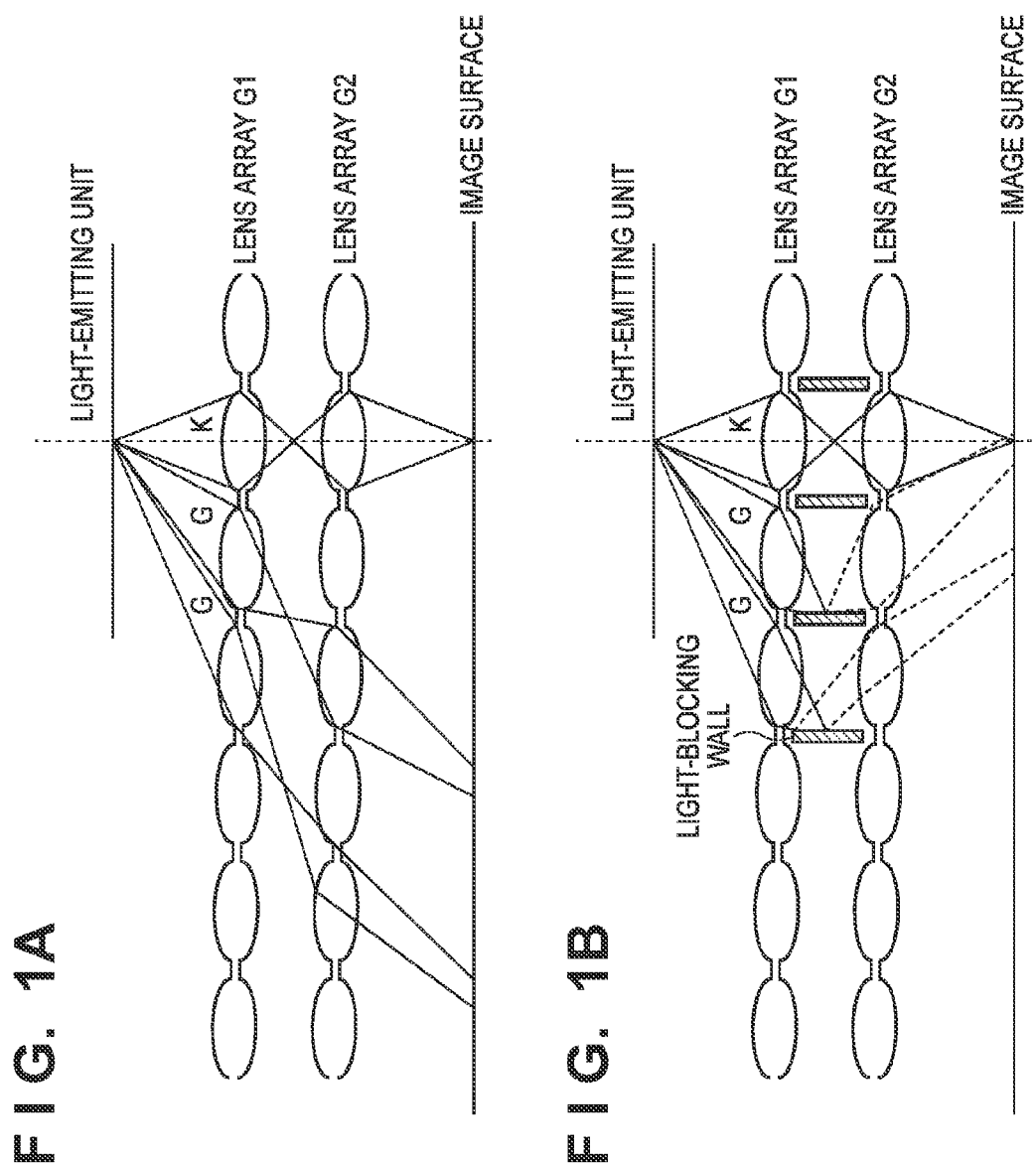
FIGS. 1A and 1B are diagrams illustrating a principle behind the production of ghost light in a lens array optical system.

FIGS. 1A and 1B are diagrams illustrating ghost light that is produced by scattering, reflection, and so on, at a light-blocking member in a lens array optical system. In FIGS. 1A and 1B, a light-emitting unit is, for example, an LED array having a plurality of light-emitting surfaces. Lens arrays G1 and G2 each have a plurality of lenses disposed in a matrix form. At several tens of μm, the interval between light-emitting surfaces in the LED array is significantly narrower than the interval between lenses in the lens arrays, which is at least several hundreds of μm, and thus, the light-emitting surfaces in the light-emitting unit can be thought of as being essentially continuous. Note that FIGS. 1A and 1B illustrate an optical path from only a single point along the continuous light-emitting surfaces in the light-emitting unit, in order to simplify the descriptions. In FIG. 1A, a light flux K from a single light emission point in the light-emitting unit is a light flux for forming a desired image on a photosensitive member (image surface). Meanwhile, a light flux G represents ghost light from that light emission point. As shown in FIG. 1A, after passing through a given lens in the lens array G1, a light flux that travels toward a lens in the lens array G2 on a different optical axis than the first lens becomes ghost light. FIG. 1B illustrates a light-blocking wall being provided between the lens array G1 and the lens array G2 in order to reduce the ghost light shown in FIG. 1A. Although the light-blocking wall absorbs some of the ghost light, the remaining ghost light is reflected. Ghost light indicated by a dotted line in FIG. 1B remains, and causes the image formed on the photosensitive member to degrade. The present embodiment provides an image forming apparatus capable of suppressing the influence of such ghost light.

Figure 2:
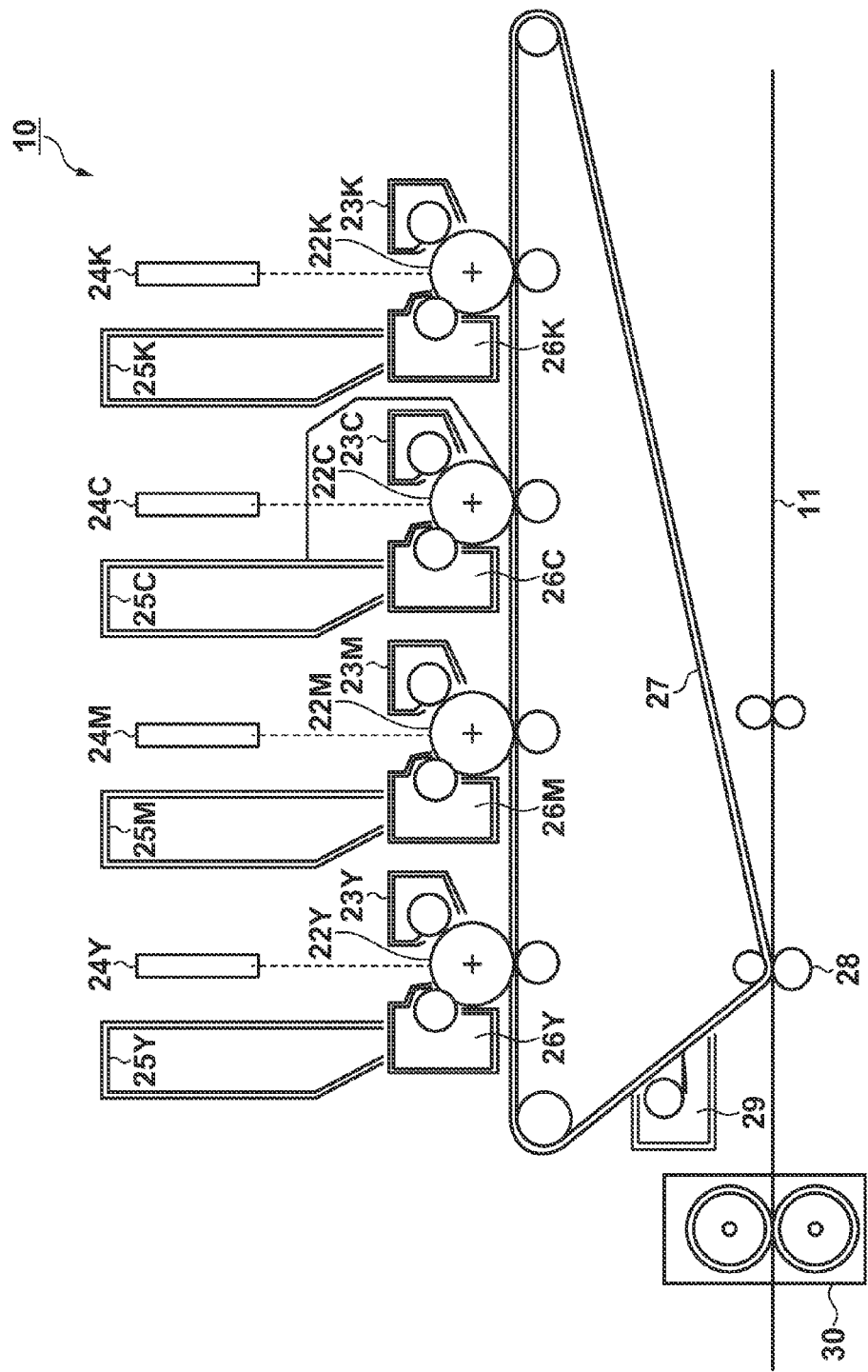
FIG. 2 is a cross-sectional view illustrating an image forming apparatus according to an embodiment.

FIG. 2 is a schematic diagram illustrating an overview of an image forming apparatus 10 according to the present embodiment. In the subsequent drawings, the letters Y, M, C, and K appended to reference numerals indicate that the processing targets in question are yellow (Y), magenta (M), cyan (C), and black (K). Note also that, in the following descriptions, reference numerals without letters appended thereto will be used in the case when it is not necessary to distinguish among different colors. A charging unit 23 charges a photosensitive member 22 that is rotationally driven, and an exposure unit 24 scans the surface of the charged photosensitive member 22 with light in order to form an electrostatic latent image thereon. Note that the exposure unit 24 includes the aforementioned lens array optical system. A developing unit 26 develops the electrostatic latent image on the photosensitive member 22 into a visual image using developer. A receptacle 25 supplies the developing unit 26 with the developer. A developer image formed on each photosensitive member 22 is transferred onto an intermediate transfer member 27 that is rotationally driven. At this time, the developer images of each color formed on the corresponding photosensitive members 22 are transferred onto the intermediate transfer member 27 in a superimposed manner, forming a multicolor developer image on the intermediate transfer member 27 as a result. The developer image transferred onto the intermediate transfer member 27 is then transferred by a transfer roller 28 onto a recording material conveyed along a conveyance path 11. Note that developer remaining on the intermediate transfer member 27 without being transferred onto the recording material is removed by a cleaning unit 29. A fixing unit 30 fixes the developer image onto the recording material. After the developer image has been fixed by the fixing unit 30, the recording material is discharged to the exterior of the apparatus. Note that the image forming apparatus may transfer the developer image from the photosensitive member 22 onto the recording material directly, instead of using the intermediate transfer member 27.

FIG. 3 is a block diagram illustrating a control system in the image forming apparatus 10. A host PC 210 sends PDL (Page Description Language) data to the image forming apparatus 10. The PDL data includes rendering data, which is image data expressing an image to be formed, as well as control data for controlling image forming operations using the rendering data. The image forming apparatus 10 is broadly divided into a control unit 220 and a mechanical section 230. The mechanical section 230 carries out processing from the forming of the developer image on the photosensitive member 22 to the fixing of the image onto the recording material, handles the conveyance of the recording material, and so on, as described above with reference to FIG. 2. The control unit 220 controls the mechanical section 230. In the control unit 220, a CPU 225 uses a RAM 222 as a main memory and a work area. The mechanical section 230 is controlled by the CPU 225 reading out various types of control programs stored in the ROM 221 into the RAM 222 and executing the programs. A system bus 228 includes an address bus and a data bus. The various constituent elements in the control unit 220 are connected to the system bus 228, and can therefore access other constituent elements via the system bus 228. A host interface (IF) unit 224 is an interface for inputting/outputting rendering data and control data to/from the host PC 210. The rendering data, received in a compressed state by the host IF unit 224, is stored in the RAM 222. The CPU 225 decompresses this compressed rendering data in the RAM 222 and stores the decompressed rendering data in the RAM 222. A DMA control unit 223 transfers the rendering data in the RAM 222 to an ASIC 226 in response to an instruction from the CPU 225. A panel IF unit 227 is an interface that receives settings and instructions input by a user through a display panel unit provided in the image forming apparatus 10, from that display panel unit.

The CPU 225 and the ASIC 226 control the mechanical section 230 based on the control data and the rendering data input via the host IF unit 224. Note that the functions of the CPU 225 may be partially or entirely implemented by the ASIC 226, and conversely, the functions of the ASIC 226 may be partially or entirely implemented by the CPU 225. Furthermore, dedicated hardware may be provided separately from the image forming apparatus 10, and the functions of the CPU 225 and the ASIC 226 may be partially implemented by that dedicated hardware.

Next, processing executed by the CPU 225 and the ASIC 226 will be described with reference to FIG. 4A. A renderer 303 realized by the CPU 225 decompresses the compressed data contained in the PDL data received from the host PC 210 into the rendering data and stores the rendering data in the RAM 222. Note that, in the present embodiment, densities in the rendering data are expressed using the RGB color space, or, in other words, as R (red), G (green) and B (blue) tone values.

The rendering data stored in the RAM 222 is sent pixel-by-pixel in raster order to the ASIC 226 under the control of the DMA control unit 223. Meanwhile, a control information generating unit 304 realized by the CPU 225 sends the control information contained in the PDL data to the ASIC 226, and further obtains control information required for processes executed by the ASIC 226 from the ROM 221 and sends that information to the ASIC 226. Note that the control information held in the ROM 221 includes a color conversion table, a gamma correction table, a halftone table, a ghost light profile, and the like, for example.

The control information received by the ASIC 226 is then supplied to a color conversion processing unit 305, a gamma correction unit 306, a halftone processing unit 307, and a ghost light processing unit 308. The rendering data received by the ASIC 226 is supplied to the color conversion processing unit 305. The color conversion processing unit 305 converts an input signal configured of the R, G, and B tone values into tone values (pixel values) expressed in the CMYK color space, namely C, M, Y, and K values, and outputs the post-conversion values to the gamma correction unit 306. Using the gamma correction table contained in the control information, the gamma correction unit 306 generates tone values C', M', Y', and K' by correcting the tone values C, M, Y, and K, and outputs the corrected tone values to the halftone processing unit 307.

Using the halftone table contained in the control information, the halftone processing unit 307 converts the tone values C', M', Y', and K' into tone values C", M", Y", and K" by carrying out a halftone process, and outputs the converted tone values to the ghost light processing unit 308. The ghost light processing unit 308 generates tone values C''', M''', Y''', and K''', which are ghost light-corrected tone values, from the tone values C", M", Y", and K" by carrying out a ghost light correction process using the ghost light profile in the control information, and outputs the generated tone values to the exposure unit 24. The "ghost light profile" mentioned here is data for calculating the ghost light that will occur. Details of the ghost light correction process performed by the ghost light processing unit 308 will be given later.

Figure 4A:
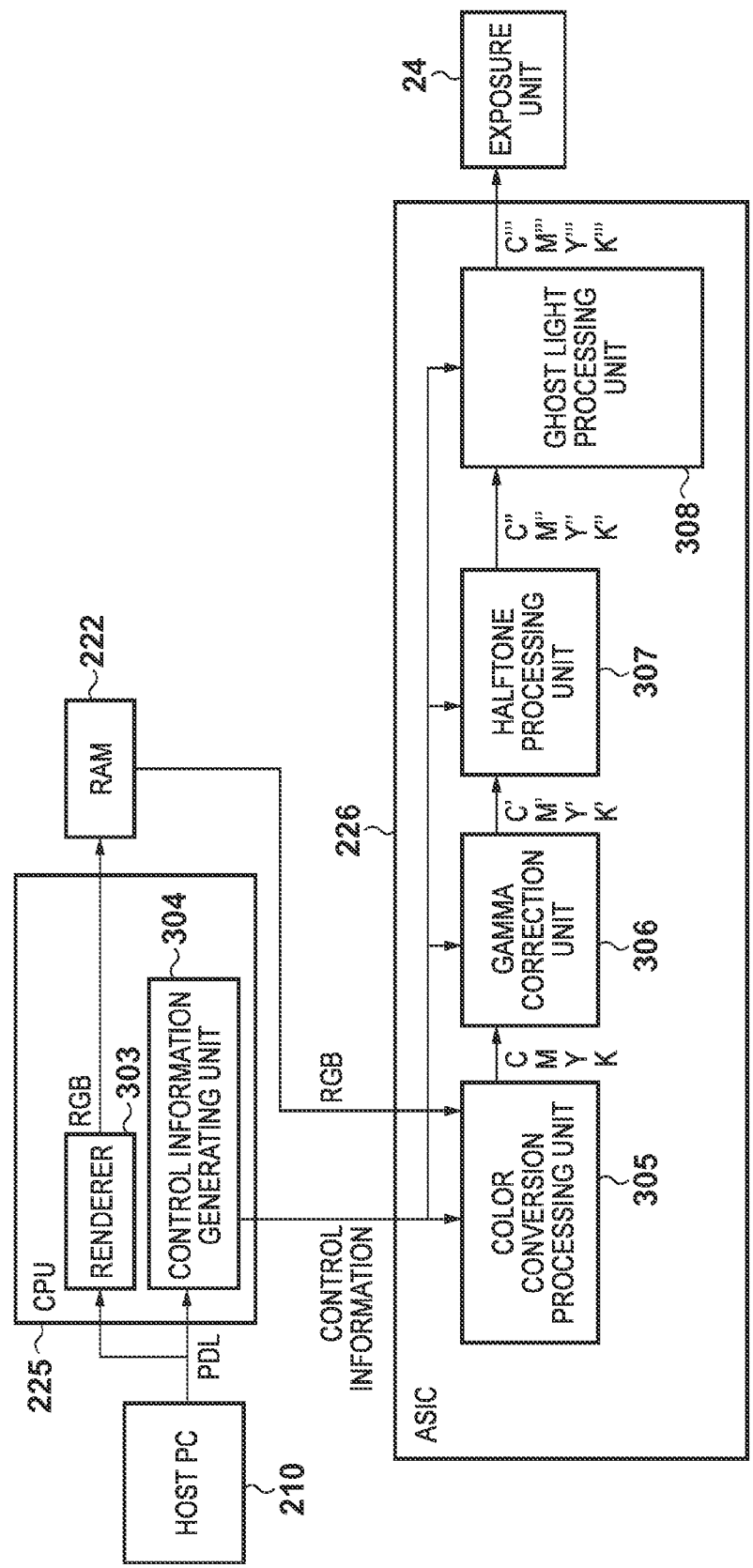

The processing performed by the ASIC 226 shown in FIG. 4A can also be implemented on the host PC 210 side, as shown in FIG. 4B. In FIG. 4B, an application 301 outputs the rendering data to the renderer 303 and outputs the control data to a control information generation unit 304. Meanwhile, a PDL conversion unit 3021 converts the tone values C", M", Y", and K", resulting from the halftone process performed by the halftone processing unit 307, and the control information into rendering data and control data, which together serve as the PDL data. The PDL data is then sent to the ASIC 226 in the image forming apparatus 10. In the ASIC 226, a renderer 3031 converts the PDL data received from the host PC 210 into the tone values C", M", Y", and K" and the control information, and outputs those values and information to the ghost light processing unit 308. Although the rendering data stored in the RAM 222 is sent to the ASIC 226 one pixel at a time in the configuration shown in FIGS. 4A and 4B, a plurality of pixels in the rendering data may be sent simultaneously in order to increase the sending speed, the processing speed, and so on.

Figure 5:
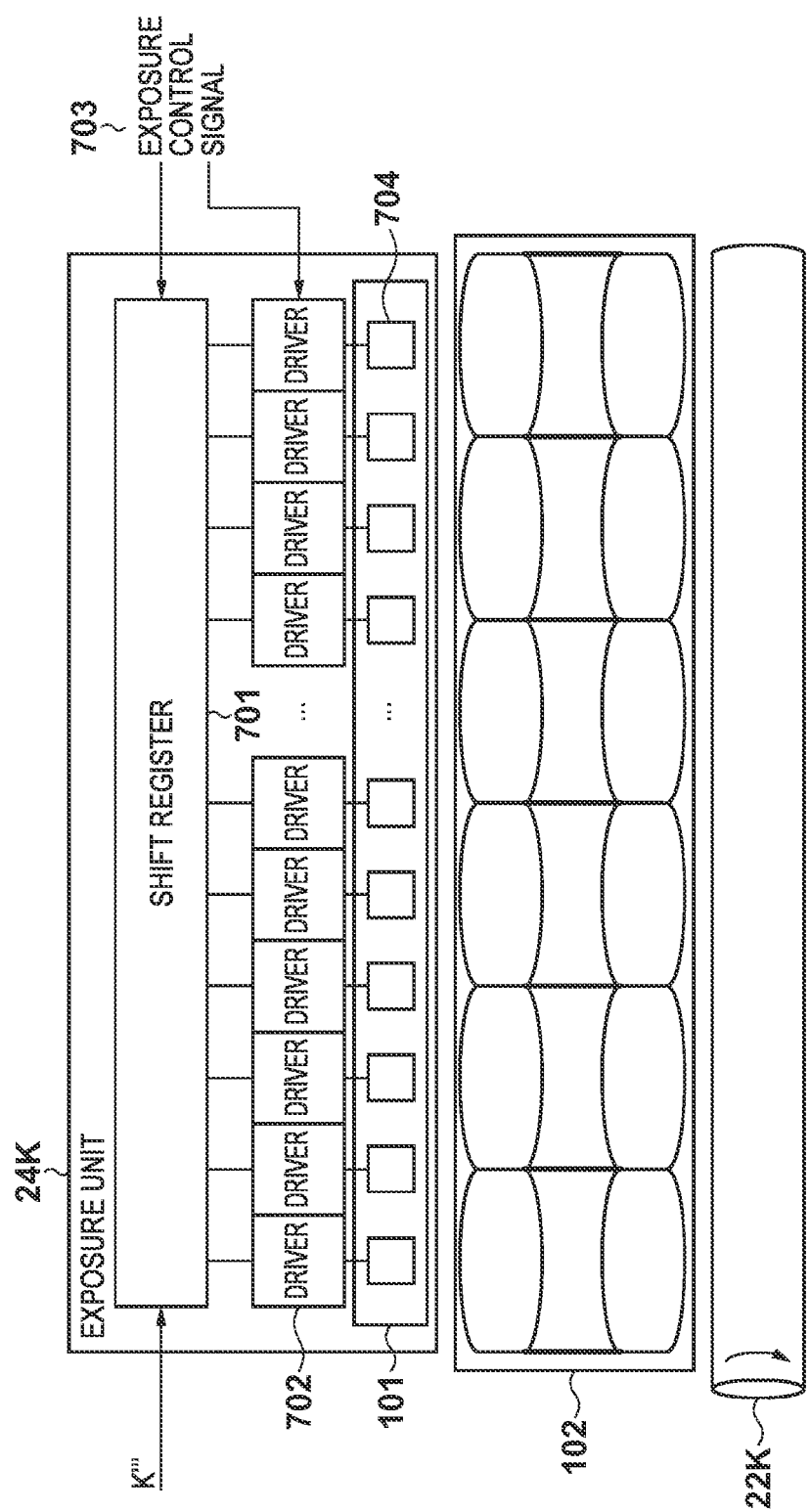
FIG. 5 is a block diagram illustrating an exposure unit according to an embodiment.

FIG. 5 is a block diagram illustrating the exposure unit 24K. Note that the exposure units 24Y, 24M, and 24C are the same. A shift register 701 holds tone values K''' for the pixels corresponding to a single line, in a main scanning direction, of the latent image formed on the photosensitive member 22K. The shift register 701 outputs the tone value K''' from each pixel to a corresponding driver 702. Each driver 702 drives a light-emitting unit 704 corresponding to each pixel in a light source unit 101, and outputs a current at a current level that is based on the tone value K''' input from the shift register 701. A light flux emitted from each light-emitting unit 704 traverses a lens array optical system 102 and forms, on the photosensitive member 22K, an image at an image point corresponding to that light-emitting unit 704. Because the light-emitting units 704 in the light source unit 101 are disposed at intervals corresponding to a single pixel and are driven at current levels corresponding to the tone values K''' corresponding to the respective pixels, an electrostatic latent image can be formed on the surface of the photosensitive member 22K in accordance with one line's worth of the rendering data.

Figure 6A:
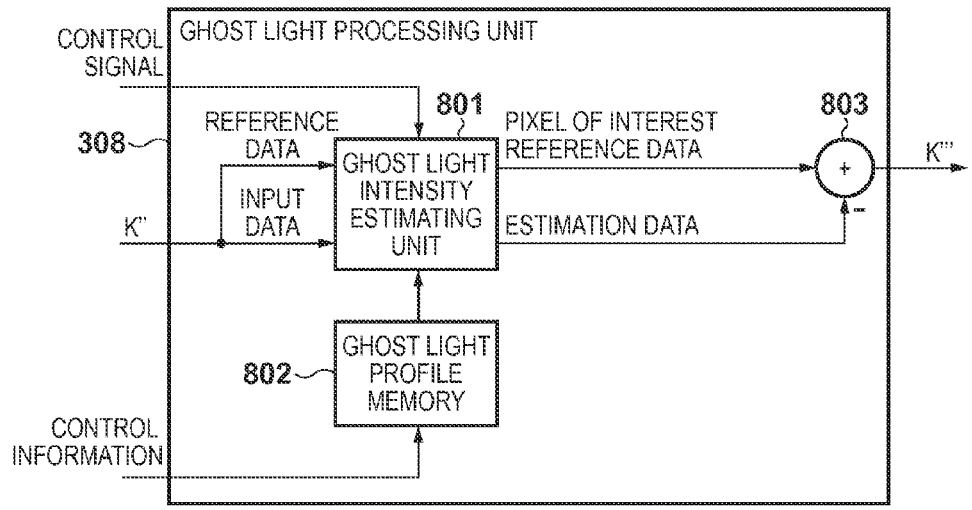
FIGS. 6A and 6B are block diagrams illustrating a ghost light processing unit according to an embodiment.

FIG. 6A is a block diagram illustrating the ghost light processing unit 308 according to the present embodiment. Although a ghost light correction process for black will be described here, the same applies to the other colors as well. A ghost light profile memory 802 stores the ghost light profile contained in the control information. The ghost light profile will be described later. A ghost light intensity estimating unit 801 estimates, using the ghost light profile and input data, an intensity of ghost light at a pixel of interest on the photosensitive member 22K, from the light-emitting units 704 corresponding to the pixels in the periphery of that pixel of interest. The ghost light intensity estimating unit 801 then outputs estimation data, which corresponds to the ghost light intensity estimated to be emitted onto the pixel of interest, and reference data, which is the tone value of the pixel of interest.

An adder 803 subtracts the ghost light intensity estimation data from the reference data of the pixel of interest and outputs the result as the post-ghost light correction process tone value K''''. As such, according to the present embodiment, the influence of the ghost light is suppressed by subtracting, from the tone value K" of the pixel of interest, a value obtained by converting the intensity of the ghost light occurring at the pixel of interest, due to the light from the light-emitting units 704 corresponding to the pixels in the periphery of the pixel of interest, into a tone value. Accordingly, the ghost light intensity estimating unit 801 and the adder 803 configure a correcting unit that estimates the intensity of the ghost light and corrects the tone value. By carrying out the same processing on the tone values K" for all of the pixels in the image to be formed, the ghost light processing unit 308 can suppress the influence of the ghost light on all of the pixels. The units will be described in greater detail below.

Figure 6B:
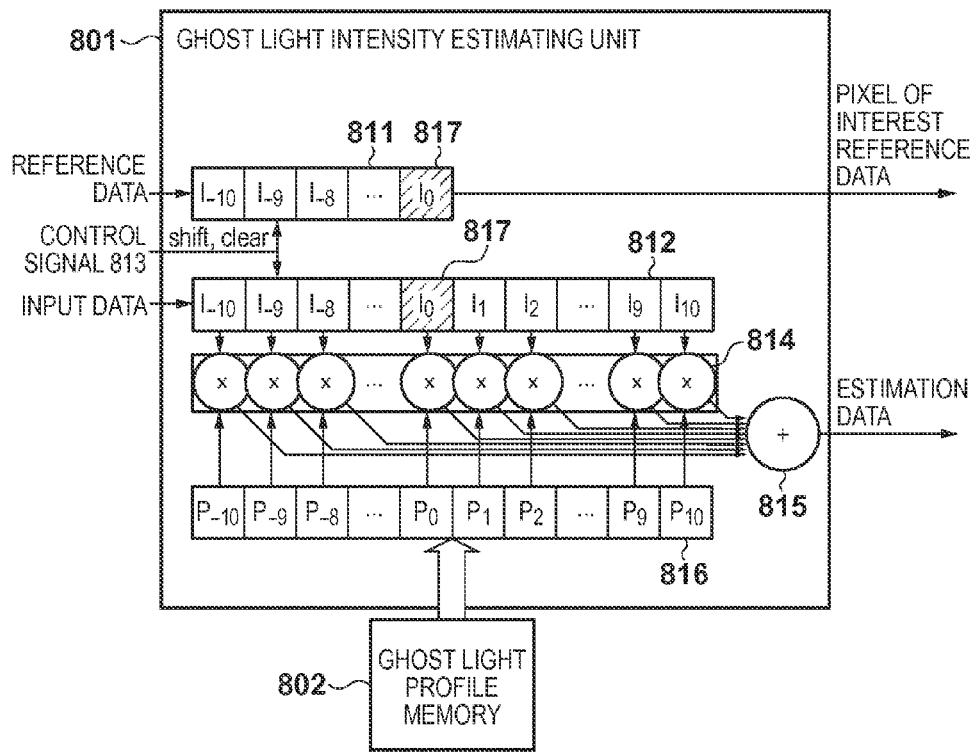

FIG. 6B is a block diagram illustrating the ghost light intensity estimating unit 801. As shown in FIG. 6B, the ghost light intensity estimating unit 801 includes a shift register 811, a shift register 812, a multiplier array 814, an adder 815, and a register 816. Operations performed by the ghost light intensity estimating unit 801 will be described hereafter using the flowchart shown in FIG. 7.

First, in step S100, the ghost light intensity estimating unit 801 loads the ghost light profile from the ghost light profile memory 802 into the register 816. Note that the profile may be loaded directly from the ROM 221, or the like, without using the ghost light profile memory 802. FIG. 8C illustrates an example of the ghost light profile. The ghost light profile is data expressing a ratio or a percentage of ghost light irradiated at the position of the pixel of interest on the photosensitive member 22K by the light-emitting unit 704 corresponding to a pixel in a predetermined positional relationship with the pixel of interest. Reference numeral 1001 in FIG. 8C indicates the position of the pixel of interest, and, in this example, 21 pixels' worth of data from 10 pixels to the left and right of the pixel of interest serves as the profile. For example, in FIG. 8C, data "0.04" indicated by reference numeral 1002 shows that 4% of the light flux emitted from the light-emitting unit 704 two pixels to the left of the pixel of interest is irradiated as ghost light onto the pixel of interest on the photosensitive member 22K. Note that left and right are inverted in order to conform to the arrangement of the data in the shift register 812, which will be described later.

Accordingly, the ghost light profile is information expressing a relationship between the intensity of the ghost light at the position of the pixel of interest and the intensity of light emitted from a light-emitting unit 704 corresponding to a different pixel from the pixel of interest in the case when the photosensitive member is exposed using that light-emitting unit 704. Note that the intensity of the light emitted from the light-emitting unit 704 is proportional to the tone value of that light-emitting unit 704. Accordingly, the ghost light profile is also a ratio between the tone value of a different pixel from the pixel of interest and a value obtained by using the tone value to convert the intensity of the ghost light occurring at the position of the pixel of interest when the light-emitting unit 704 corresponding to the stated different pixel is caused to emit light at the stated tone value.

The data of a pixel of interest 1001 is written into a position PO in the register 816. Although the present embodiment discusses a ghost light profile corresponding to twenty-one pixels, a ghost light profile having any number of pixels can be used. Furthermore, although the present embodiment applies the same ghost light profile to all of the pixels under the assumption that the ghost light has a uniform profile, a configuration in which, for example, different ghost light profiles are used for each different pixel can also be employed. The ghost light profile can be determined when the lens array optical system 102 is designed. The ghost light profile can also be determined through individual measurement after the lens array optical system 102 is manufactured.

Next, in step S101, the respective register values in the shift register 811 and the shift register 812 are reset to zero in response to a control signal 813 from the ASIC 226 indicating a "clear" operation. The shift register 812 holds input data, and the size thereof is the same as the number of data in the ghost light profile. The shift register 811 also holds the reference data, whose size is the same as the number of data from a left end of the ghost light profile to the position of the pixel of interest 1001, or, in other words, is eleven pixels in the present embodiment. The positions in the shift register 811 and the shift register 812 that correspond to the position PO of the pixel of interest in the ghost light profile are positions I0, indicated by reference numeral 817 in FIG. 6B.

Next, in step S102, the shift register 811 and the shift register 812 shift to the right in response to a control signal 813 from the ASIC 226 indicating a shift operation, and the reference data is set in the shift register 811, and the input data is set in the shift register 812. Note that the data input one pixel at a time in raster order is shifted, in order, to the right, and thus, the shift register 811 and the shift register 812 hold data in which the original data has been inverted horizontally.

Next, in step S103, the multiplier array 814 multiplies the ghost light profile in the register 816 by the data in the shift register 812 on a pixel-by-pixel basis. As described above, the ghost light profile is data expressing a percentage of ghost light occurring at the pixel of interest on the photosensitive member 22K relative to the light from a light-emitting unit 704 corresponding to a different pixel from the pixel of interest. Accordingly, the result of the multiplication performed here is the intensities of the ghost light irradiated at the position of the pixel of interest on the photosensitive member 22K by the light-emitting units 704 of the pixels that are different from the pixel of interest being converted into tone values. Then, in step S104, the adder 815 calculates a sum of the multiplication results from the multiplier array 814. The sum of the multiplication results is a total value of the intensity of the ghost light irradiated at the position of the pixel of interest on the photosensitive member 22K by the light-emitting units 704 of the pixels that are different from the pixel of interest being converted into a tone value.

The ghost light intensity estimating unit 801 outputs the tone value of the pixel of interest I0 in the shift register 811 as pixel of interest reference data in step S105, and outputs the result of the calculation performed by the adder 815 as the estimation data in step S106. Next, in step S107, the ghost light intensity estimating unit 801 determines whether one line's worth of processing is complete, and repeats the processing from step S102 in the case when the one line's worth of processing is not complete. On the other hand, in the case when the one line's worth of processing is complete, it is determined in step S108 whether one page's worth of processing is complete, and the processing is repeated from step S101 in the case when the one page's worth of processing is not complete. The operations performed by the ghost light intensity estimating unit 801 end in the case when the one page's worth of processing is complete.

Figure 8A:
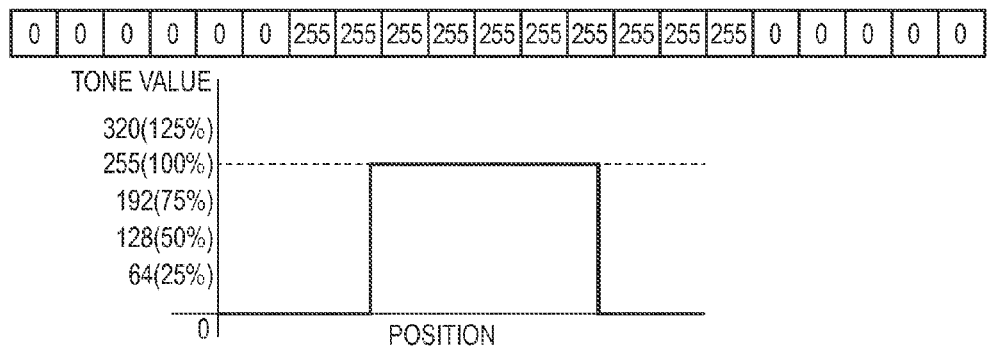
FIGS. 8A-8C are diagrams illustrating rendering data, exposure intensity, and ghost light intensity according to an embodiment.
Figure 8B:
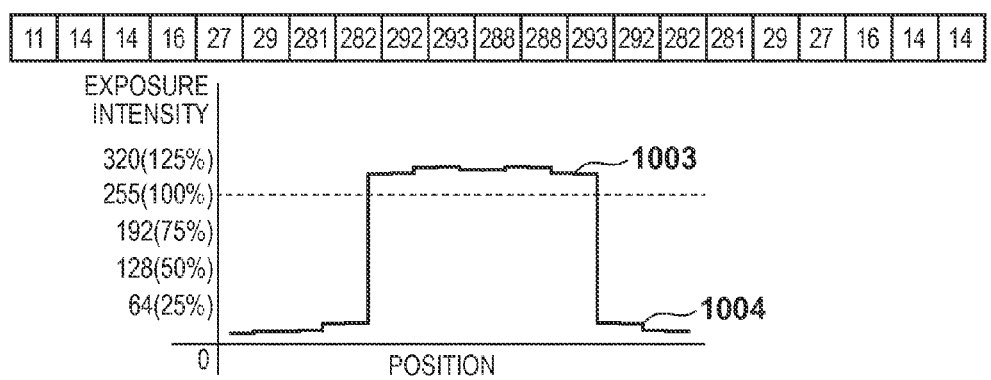
Figure 8C:
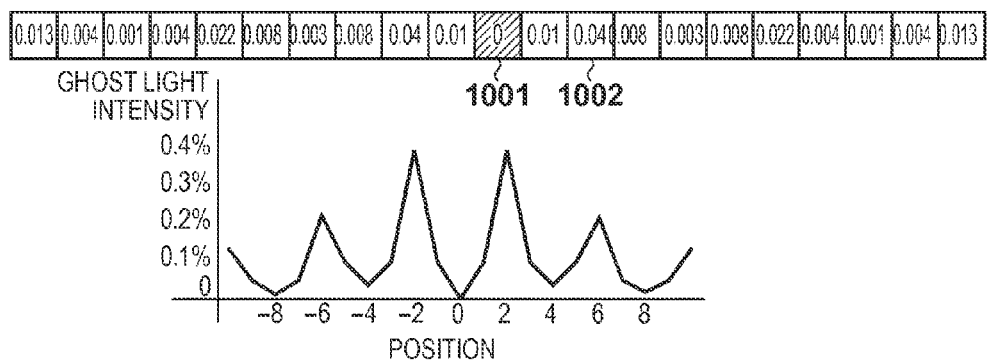
Figure 9A:
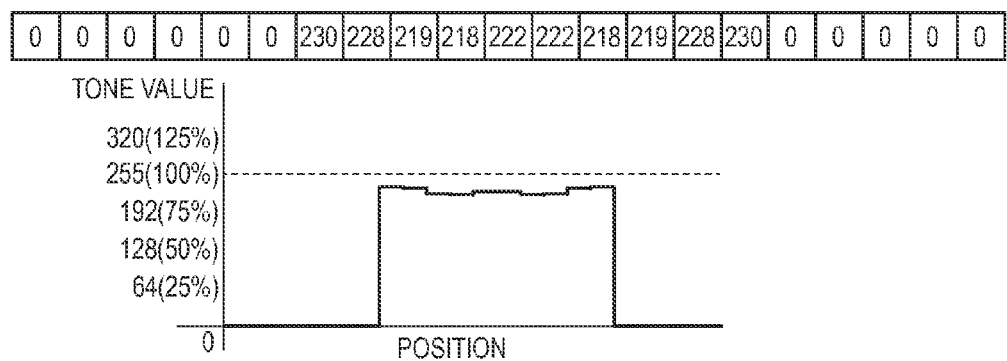
FIGS. 9A and 9B are diagrams illustrating rendering data output by a ghost light processing unit, and exposure intensity, according to an embodiment.
Figure 9B:
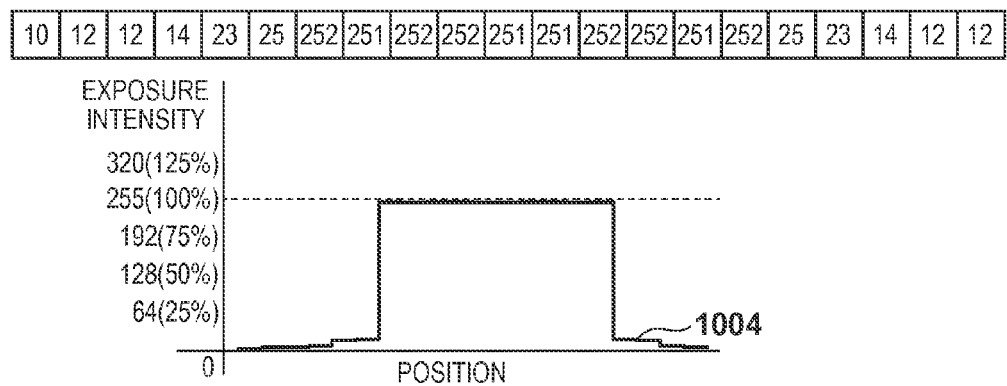

FIG. 8A illustrates rendering data, in which the values of ten consecutive pixels in a single line are two hundred fifty-five and the values of the other pixels in the same line are zero, loaded into the shift register 812. Note that a graph whose vertical axis represents the tone values of the rendering data is also shown below the data in the shift register 812. FIG. 8B illustrates numerical value data and a graph obtained by converting an exposure intensity distribution at the surface of the photosensitive member 22K into tone values in the case when the photosensitive member 22K has been exposed by the exposure unit 24K according to the rendering data shown in FIG. 8A. Note that the ghost light profile is as shown in FIG. 8C. In FIG. 8B, it can be seen that the influence of the ghost light has resulted in exposure at a different exposure intensity than that indicated by the rendering data in FIG. 8A. FIG. 9A indicates the tone values K'" obtained as a result of the ghost light processing unit 308 processing the tone values K" in the rendering data shown in FIG. 8A, and a graph of the tone values K'". FIG. 9B, meanwhile, illustrates numerical value data and a graph of an exposure intensity distribution at the surface of the photosensitive member 22K in the case when the photosensitive member 22K has been exposed by the exposure unit 24K according to the rendering data shown in FIG. 9A. Compared to FIG. 8B, it can be seen that the influence of the ghost light has been suppressed, and the photosensitive member 22K has been exposed at almost the same exposure intensity as that indicated by the rendering data in FIG. 8A.

As described thus far, according to the present embodiment, the influence of the ghost light is suppressed by subtracting the estimation data of the ghost light intensity from the input rendering data and correcting the rendering data, and then carrying out exposure using the corrected rendering data. Through this, the influence of the ghost light can be suppressed while, at the same time, avoiding complicating the shape and increasing the size of a light-blocking member 108 that is used.

Second Embodiment

Figure 10A:
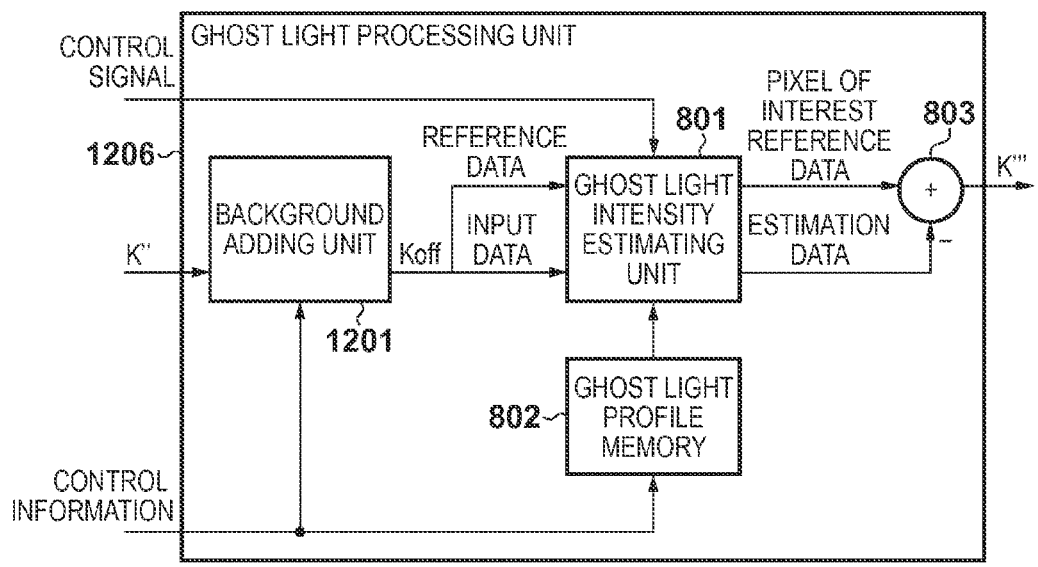
FIGS. 10A-10C are block diagrams illustrating a ghost light processing unit according to an embodiment.

In the first embodiment, if the tone value K" in the rendering data input into the ghost light processing unit 308 is a lower value than the estimation data of the ghost light intensity, the estimation data of the ghost light intensity cannot be subtracted. In this case, pixels in which the influence of the ghost light remains will occur, as indicated by reference numeral 1004 in FIG. 9B. The present embodiment further suppresses this remaining influence. FIG. 10A is a block diagram illustrating a ghost light processing unit 1206 according to the present embodiment. Although a ghost light correction process for black will be described here, the same applies to the other colors as well. The ghost light processing unit 1206 shown in FIG. 10A differs from the ghost light processing unit 308 shown in FIG. 6A in that a background adding unit 1201 is included. In the ghost light processing unit 1206 according to the present embodiment, the reference data and the input data input to the ghost light intensity estimating unit 801 become tone values Koff output by the background adding unit 1201. Furthermore, the control information also contains operational parameters for the background adding unit 1201.

Figure 10B:
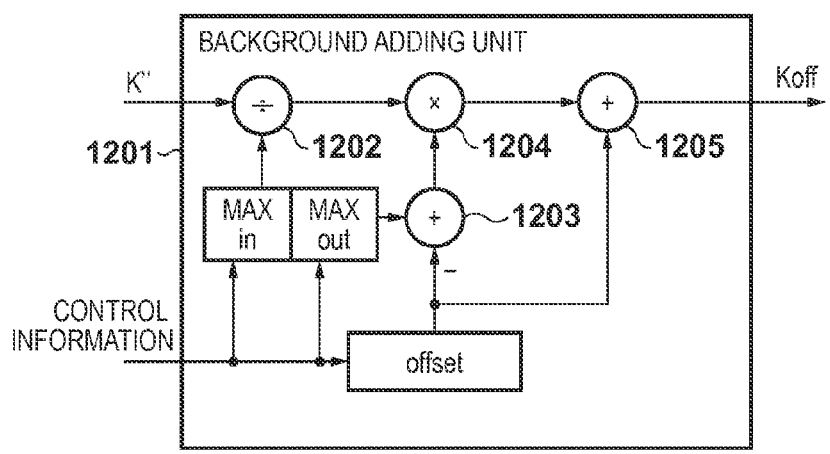

The background adding unit 1201 is a conversion unit that performs an adding process on the tone values K" and outputs the result as the tone value Koff. FIG. 10B is a block diagram illustrating the background adding unit 1201. The control information input into the background adding unit 1201 contains three parameter values, namely "MAXin", "MAXout", and "offset". The background adding unit 1201 includes a divider 1202, a multiplier 1204, and adders 1203 and 1205, and carries out the following calculation using the tone value K" as an input, outputting the result of the calculation as the tone value Koff.

$$Koff=(K"/MAXin)\times(MAXout-offset)+offset$$

Figure 10C:
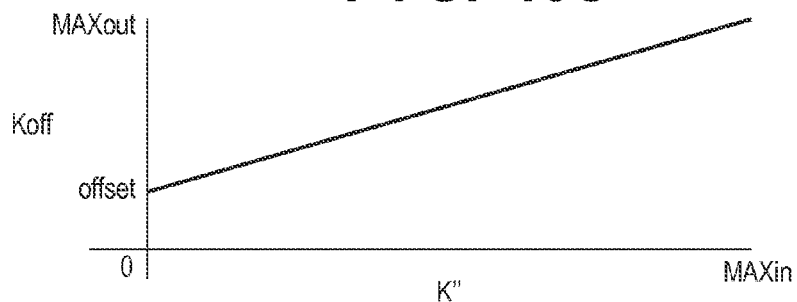

FIG. 10C illustrates a relationship between the tone value K" and the tone value Koff. By carrying out this calculation, the tone value K", which takes on a value from 0 to MAXin, is increased by a value based on the tone value K", and is converted into the tone value Koff, which takes on a value from offset to MAXout. For example, in the case when the tone value K" and the tone value Koff are 8-bit values and the offset is 57, setting MAXin and MAXout to 255 makes it possible to convert the tone value K", which takes on a value from 0 to 255, into the tone value Koff, which takes on a value from 57 to 255.

In this example, carrying out this adding process reduces the number of tones from 256 tones to 199 tones. In this case, increasing the bit number of the tone value Koff to 9 bits, for example, and using 511 as MAXout makes it possible to convert into a tone value Koff that takes on a value from 57 to 511, which in turn makes it possible to prevent such a drop in the number of tones. The following descriptions assume that the tone value Koff is 8 bits, the operational parameters MAXin and MAXout are 255, and the adding amount offset is 57.

Figure 11A:
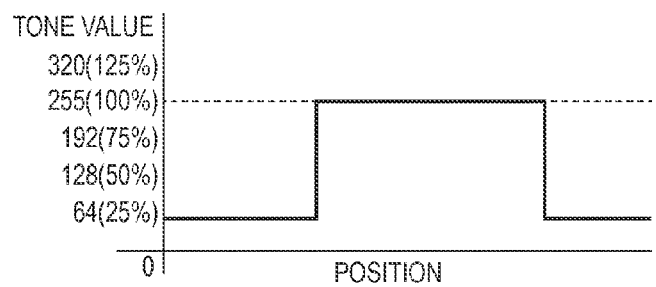
FIGS. 11A-11C are diagrams illustrating rendering data output by a ghost light processing unit, and exposure intensity, according to an embodiment.
Figure 11B:
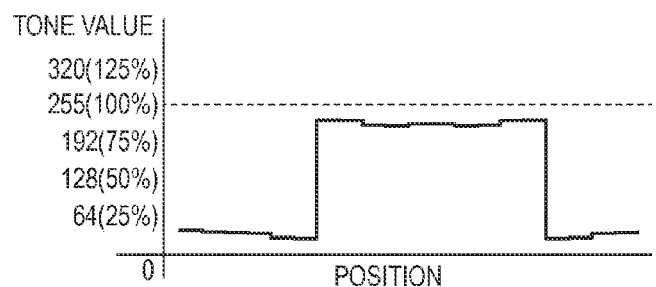
Figure 11C:
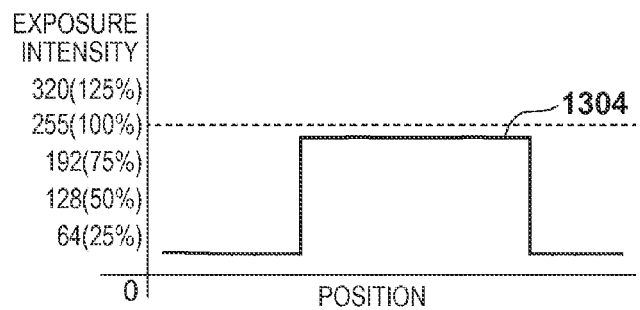

FIG. 11A is an example of the tone values Koff resulting from the adding process performed by the background adding unit 1201, using the tone values K" in the rendering data shown in FIG. 8A. It can be seen that the tone values K", which take on values from 0 to 255, have been converted into the tone values Koff, which take on values from 57 to 255. FIG. 11B illustrates an example of tone values K'" obtained as a result of the calculation performed by the ghost light processing unit 1206, using the tone values Koff as the reference data and the input data input into the ghost light intensity estimating unit 801. It can be seen that because the tone values Koff obtained by converting the input rendering data are used, the ghost light intensity estimation data has been successfully subtracted in all of the pixels. FIG. 11C illustrates numerical value data and a graph of an exposure intensity distribution at the photosensitive member 22K in the case when the photosensitive member 22K has been exposed by the exposure unit 24K according to the rendering data shown in FIG. 11B. According to the configuration of the present embodiment, it can be seen that remaining components of the ghost light, indicated by reference numeral 1004 in FIG. 9B, have been successfully suppressed.

FIGS. 12A and 12B are schematic diagrams illustrating biases used when forming images according to the present embodiment. In the present embodiment, the background adding unit 1201 performs an adding process on the rendering data, and thus, the image density after the image has been formed will change if the bias value that is normally used is employed as-is, as shown in FIG. 12A. In FIG. 12A, VD indicates a potential of the photosensitive member 22K charged by the charging unit 23K, and is −500 V, for example. VL, meanwhile, indicates a potential of the surface of the photosensitive member 22K when the photosensitive member 22K has been exposed at a 100% exposure intensity, and is −200 V, for example. Furthermore, Vdev indicates a developing bias output by the developing unit 26K, and is −350 V, for example.

As indicated by reference numeral 1401 in FIG. 12A, the developer adheres in regions where the potential of the surface of the photosensitive member 22K has become greater than or equal to the developing bias Vdev due to the exposure. A developing contrast Vcont is a voltage difference between Vdev and VL, and is set to 150 V, for example. The image density changes when the developing contrast Vcont changes, and as the developing contrast Vcont increases, so does the amount of developer that is applied, which results in an increased image density. Meanwhile, a developing back contrast Vback is a voltage difference between VD and Vdev, and is set to 150 V, for example. The developing back contrast Vback is a suppressing voltage for ensuring that the toner does not develop unexposed areas, and when the developing back contrast Vback changes, fogging occurs due to toner being developed in unexposed areas.

FIG. 12B illustrates an example of a bias value in the case when the offset processing according to the present embodiment is carried out. In this example, the bias is set so that when the surface of the photosensitive member 22K is exposed at an exposure intensity of 100%, the voltage on the surface of the photosensitive member 22K changes by 385 V, to −115 V. This can be realized by setting the level of the current that flows through the light-emitting units 704 when the exposure intensity is 100% to approximately 1.28×.

The tone value Koff takes on a value from 57 to 255 in the case when the offset is 57, and thus, the corresponding exposure intensity is 22% to 100%. In other words, in the case when the adding process is carried out, the surface of the photosensitive member 22K is exposed at an exposure intensity of at least 22%. When the surface of the photosensitive member 22K is exposed with light having an exposure intensity of 22%, the potential of the surface of the photosensitive member 22K changes by 85 V, to −415 V, as indicated by Voff in FIG. 12B. As shown in FIG. 12B, setting the developing bias value Vdev of the developing unit 26K to −265 V makes it possible to set the developing contrast Vcont and the developing back contrast Vback to the same 150 V, as shown in FIG. 12A. Accordingly, the image density will not change, and fogging will not occur, even in the case when the adding process is carried out.

As described thus far, according to the present embodiment, the ghost light intensity estimation data is subtracted, and the corrected rendering data is calculated after performing the adding process on the input rendering data. The influence of the ghost light can be suppressed according to this configuration. Furthermore, changes in the image density can be suppressed by changing the developing bias in accordance with an amount by which a maximum value or a minimum value of the tone values changes and maintaining the developing contrast at a predetermined value.

Third Embodiment

In the first embodiment and the second embodiment, the ghost light intensity estimation data is subtracted from the rendering data, and the result is taken as new rendering data. However, when exposure is carried out using the new rendering data obtained by subtracting the ghost light intensity estimation data, the exposure intensity will drop relative to that of the input rendering data. For example, comparing FIG. 11A with FIG. 11C, pixels for which the tone value is 100% (a tone value of 255) in the input rendering data are exposed at an exposure intensity of 97% (a tone value of 248), as indicated by reference numeral 1304.

Figure 13:
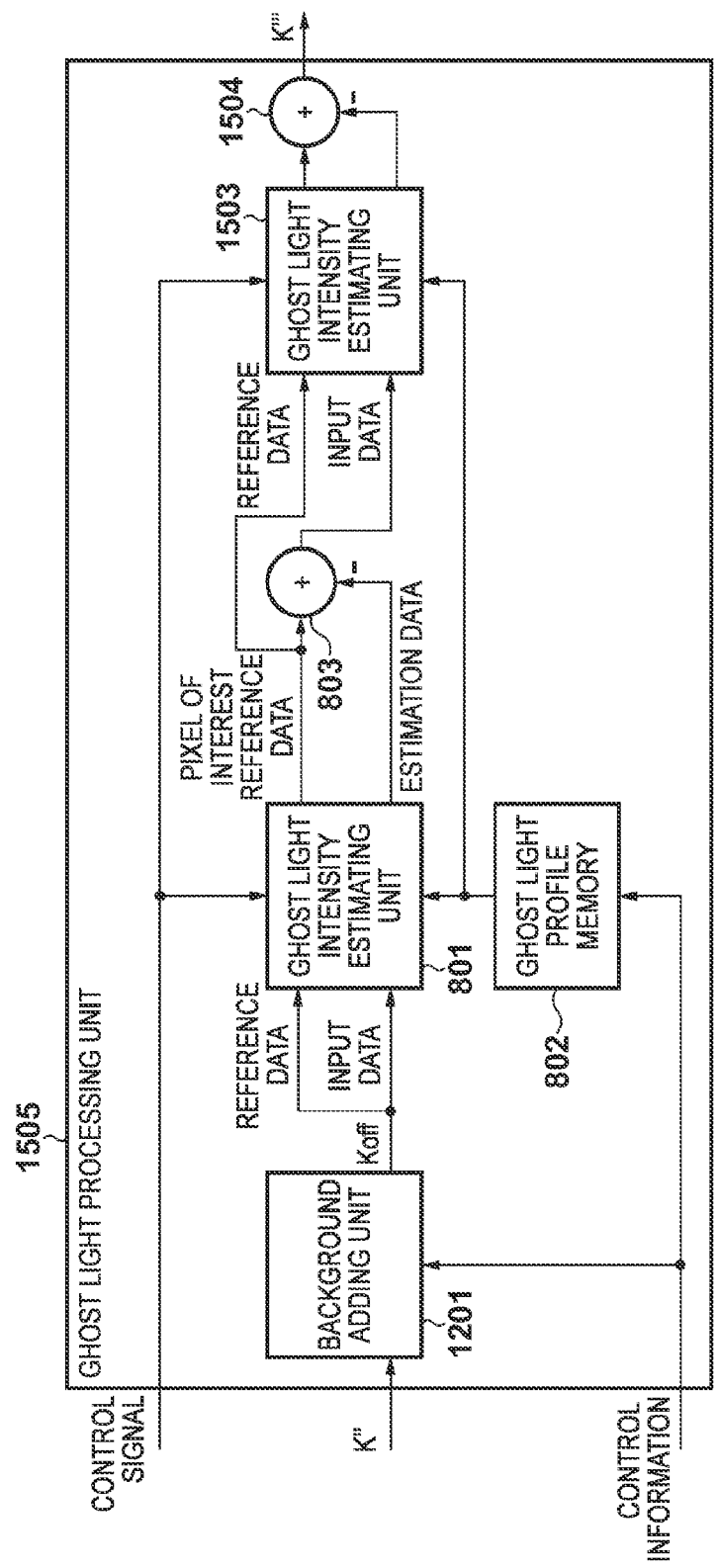
FIG. 13 is a block diagram illustrating a ghost light processing unit according to an embodiment.

The present embodiment more accurately suppresses the influence of ghost light, and FIG. 13 illustrates the configuration of a ghost light processing unit 1505 according to the present embodiment. Although a ghost light correction process for black will be described here, the same applies to the other colors as well, as in the first embodiment and the second embodiment.

The ghost light processing unit 1505 shown in FIG. 13 adds a ghost light intensity estimating unit 1503 and an adder 1504 to the configuration of the ghost light processing unit 1206 shown in FIG. 10A and described in the second embodiment. In other words, the correcting unit, including the ghost light intensity estimating unit 801 and the adder 803, and a correcting unit, including the ghost light intensity estimating unit 1503 and the adder 1504, are connected in series. Although the ghost light processing unit 1505 shown in FIG. 13 uses the background adding unit 1201 in the same manner as in the second embodiment, the configuration may be such that the background adding unit 1201 is not present, in the same manner as in the first embodiment.

The input data from the adder 803 and the reference data from the ghost light intensity estimating unit 801 are input into the ghost light intensity estimating unit 1503. Note that the input data from the adder 803 is data obtained by the adder 803 subtracting the estimation data from the reference data. The ghost light intensity estimating unit 1503 outputs the ghost light intensity estimation data from the input data, in the same manner as the ghost light intensity estimating unit 801. The adder 1504 subtracts the ghost light intensity estimation data from the reference data of the pixel of interest and outputs the result as the post-ghost light correction process tone value K'''.

Figure 14A:
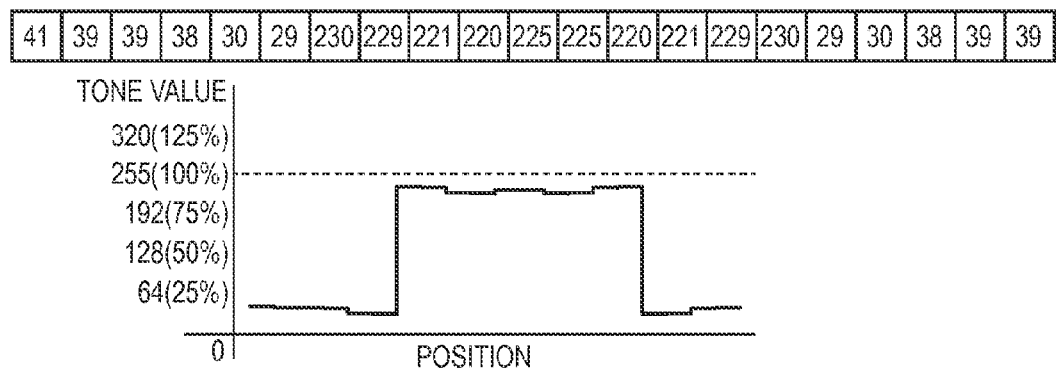
FIGS. 14A and 14B are diagrams illustrating rendering data output by a ghost light processing unit, and exposure intensity, according to an embodiment.
Figure 14B:
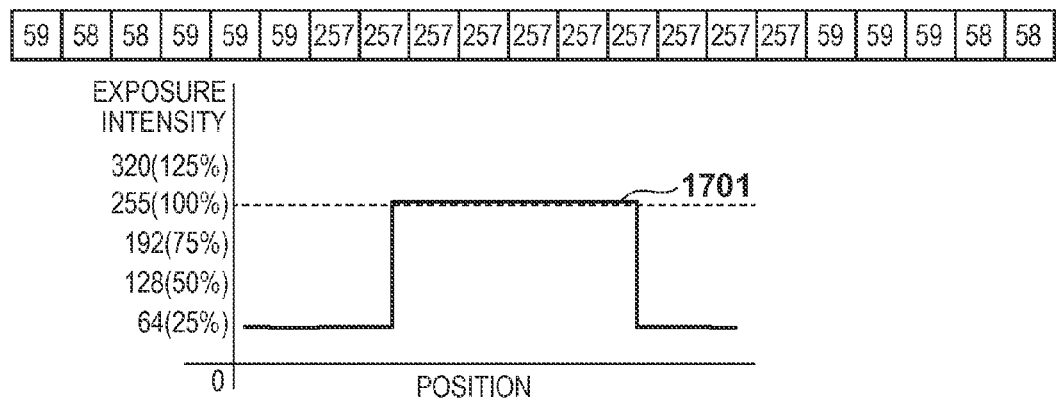

The ghost light intensity estimating unit 1503 calculates the ghost light intensity estimation data from the tone values that have undergone the ghost light correction process already, and can therefore find more accurate ghost light intensity estimation data than the ghost light intensity estimating unit 801. For example, when the tone values K'' of the rendering data shown in FIG. 8A are input, the adder 803 outputs the tone values shown in FIG. 11B, in the same manner as in the second embodiment. These tone values then serve as the input data input to the ghost light intensity estimating unit 1503. FIG. 14A illustrates the tone values K''' output by the adder 1504 in this case. FIG. 14B, meanwhile, illustrates an exposure intensity distribution at the surface of the photosensitive member 22K in the case when the photosensitive member 22K has been exposed by the exposure unit 24K according to the rendering data shown in FIG. 14A. Compared to the result described in the second embodiment and shown in FIG. 11C, it can be seen that the exposure intensity distribution shown in FIG. 14B is closer to the rendering data shown in FIG. 11A and the influence of ghost light has been more accurately suppressed. For example, reference numeral 1304 in FIG. 11C, illustrating the second embodiment, indicates that input rendering data at 100% (a tone value of 255) is exposed at 97% (a tone value of 248). However, according to the present embodiment, the exposure is carried out at an exposure intensity of almost 100%, as indicated by reference numeral 1701 in FIG. 14B.

Figure 15:
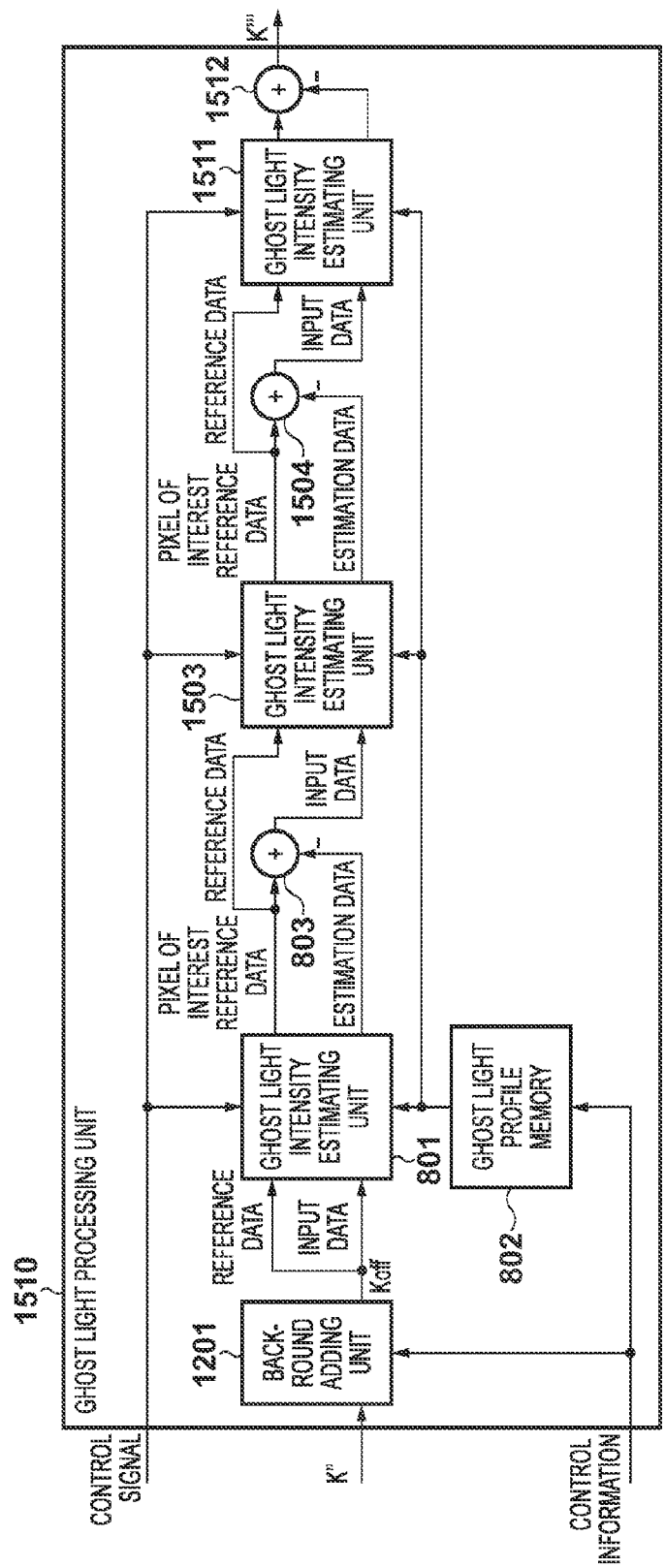
FIG. 15 is a block diagram illustrating a ghost light processing unit according to an embodiment.
Figure 16A:
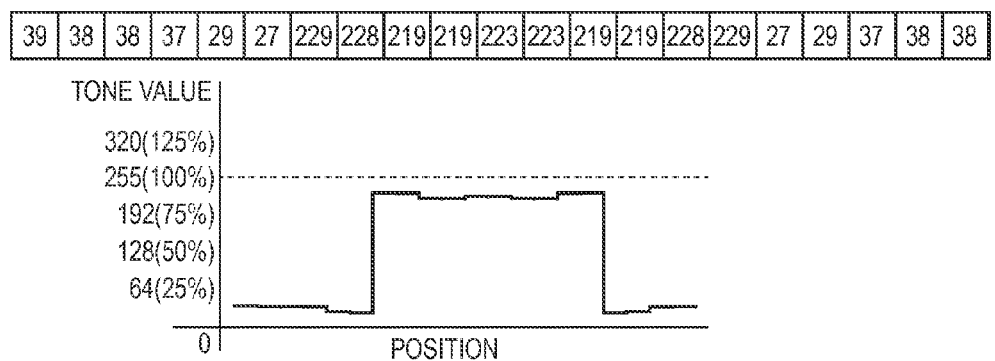
FIGS. 16A and 16B are diagrams illustrating rendering data output by a ghost light processing unit, and exposure intensity, according to an embodiment.
Figure 16B:
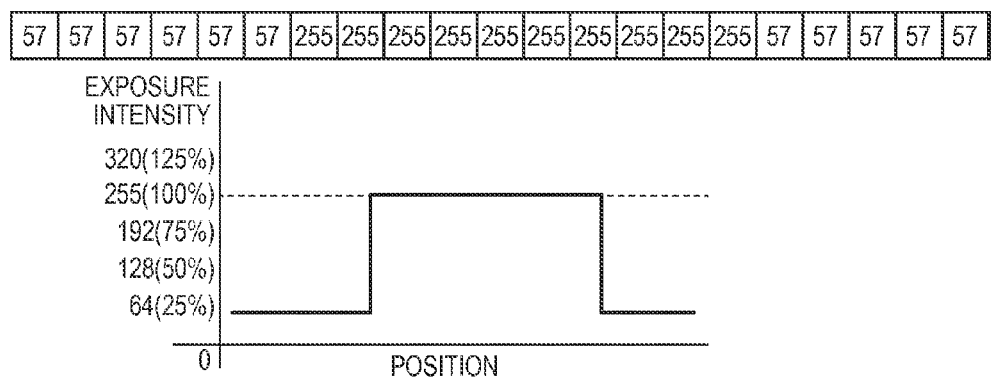

Although the ghost light processing unit 1505 shown in FIG. 13 uses two correcting units that are each configured of a ghost light intensity estimating unit and an adder, the configuration may be such that three or more correcting units are connected in series in order to suppress the influence of ghost light with an even higher level of accuracy. FIG. 15 illustrates a configuration in which a correcting unit, configured of ghost light intensity estimating unit 1511 and an adder 1512, has been added to the configuration shown in FIG. 13. FIG. 16A illustrates tone values K'''' output by a ghost light processing unit 1510 in the case when the tone values K''' of the rendering data shown in FIG. 8A have been input into the ghost light processing unit 1510. FIG. 16B, meanwhile, illustrates an exposure intensity distribution at the surface of the photosensitive member 22K in the case when the photosensitive member 22K has been exposed by the exposure unit 24K according to the rendering data shown in FIG. 16A. As can be seen from FIG. 16B, increasing the number of ghost light intensity estimating units brings the exposure intensity closer to the original tone values K''.

By repeating the process of subtracting the ghost light estimation data from the reference data finding the ghost light estimation data based on the post-subtraction values, and then once again subtracting the estimation data, makes it possible to accurately suppress the influence of ghost light. Note that four or more correcting units may be connected in series. Regardless of how many correcting units are provided, the correcting unit in the first stage takes the uncorrected rendering data or the rendering data converted by the background adding unit 1201 as input data, and the second and subsequent correcting units take the data output by the correcting unit previous thereto as an input. Then, the correcting unit in the final stage subtracts values corresponding to the estimated ghost light intensity from the tone values in the original rendering data, and takes the result as the corrected rendering data.

Fourth Embodiment

In the third embodiment, the influence of ghost light is accurately suppressed by using a plurality of ghost light intensity estimating units. However, if, for example, a plurality of ghost light intensity estimating units are provided in the ASIC 226, the circuit scale of the ASIC 226 will increase, whereas if the ghost light intensity estimating units are realized by the CPU 225, the processing time of the CPU 225 will increase.

Figure 17:
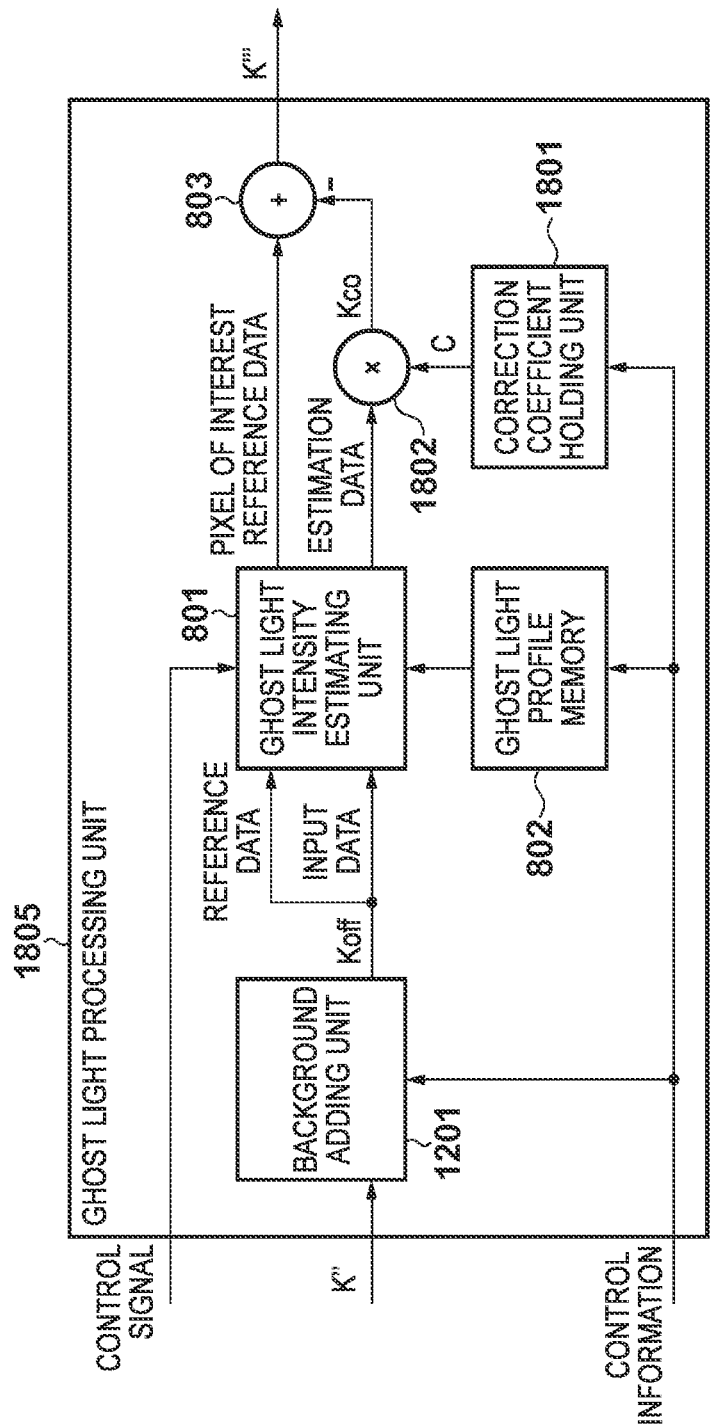
FIG. 17 is a block diagram illustrating a ghost light processing unit according to an embodiment.

The present embodiment accurately suppresses the influence of ghost light with a simple configuration, using a single ghost light intensity estimating unit. FIG. 17 is a block diagram illustrating a ghost light processing unit 1805 according to the present embodiment. Although a ghost light correction process for black will be described here, the same applies to the other colors as well. The ghost light processing unit 1805 according to the present embodiment adds a correction coefficient holding unit 1801 and a multiplier 1802 to the ghost light processing unit 1206 shown in FIG. 10A and described in the second embodiment. Furthermore, the control information contains a coefficient held in the correction coefficient holding unit 1801. The multiplier 1802 multiplies the estimation data outputted by the ghost light intensity estimating unit 801 by the correction coefficient held in the correction coefficient holding unit 1801, and outputs corrected estimation data Kco. The adder 803 subtracts the corrected estimation data Kco from the reference data of the pixel of interest and outputs the result as the post-ghost light correction process tone value K'''.

Figure 18A:
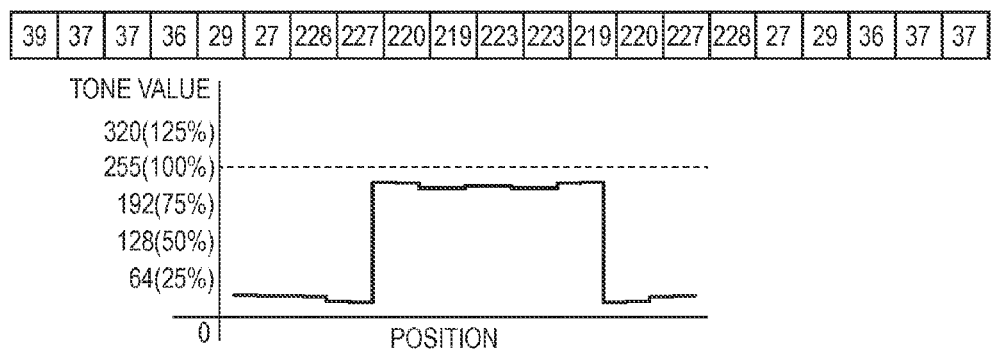
FIGS. 18A and 18B are diagrams illustrating rendering data output by a ghost light processing unit, and exposure intensity, according to an embodiment.
Figure 18B:
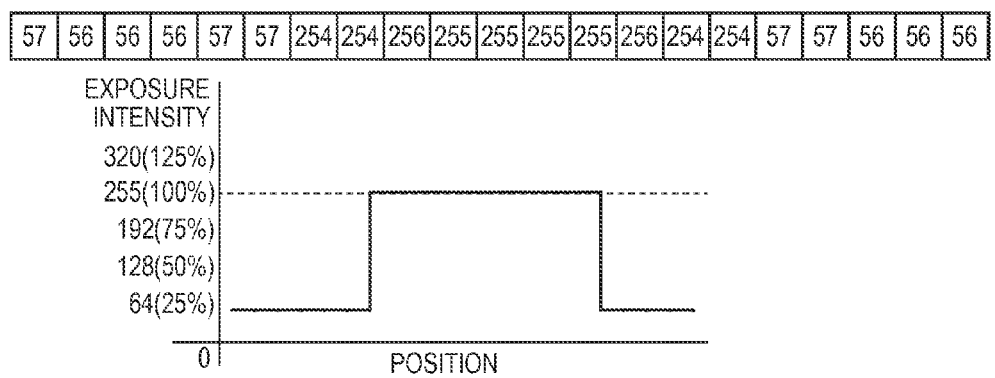

If the ghost light intensity estimation data is subtracted as-is by the adder 803, there will be cases when a greater value than that of the actual ghost light intensity is subtracted. By setting the correction coefficient to an appropriate value of greater than or equal to 0 and less than or equal to 1 and suppressing the subtraction amount, a value that is closer to the actual ghost light intensity can be subtracted. FIG. 18A illustrates tone values K''' obtained as a result of calculations performed by the ghost light processing unit 1805 in the case when the tone values K'' of the rendering data shown in FIG. 8A are employed. Note that a correction coefficient of 0.85 is used here. FIG. 18B illustrates numerical value data and a graph of an exposure intensity distribution at the photosensitive member 22K in the case when the photosensitive member 22K has been exposed by the exposure unit 24K according to the rendering data shown in FIG. 18A. It can be seen, from FIG. 18B, that the result is closer to the rendering data shown in FIG. 11A than the result shown in FIG. 11C, described in the second embodiment, and that the influence of ghost light has been more accurately suppressed.

Note that the present invention can also be realized as an image processing apparatus that includes the ghost light processing unit 308 shown in FIG. 4A or FIG. 4B and that outputs rendering data to an image forming apparatus including the photosensitive member 22 and the exposure unit 24 shown in FIG. 5.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or an apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
an exposure unit, including a plurality of light-emitting units that correspond to a respective plurality of pixels and a lens array optical system, for emitting exposure light;
a photosensitive member exposed by the exposure light from the exposure unit;
a storage unit configured to hold information indicating a relationship between (i) light from a light-emitting unit corresponding to a predetermined pixel that is different from a pixel of interest and (ii) ghost light produced at a position of the pixel of interest on the photosensitive member by the light exposure; and
a correcting unit configured to estimate an intensity of ghost light at a position of each pixel on the photosensitive member in a case when the photosensitive member is exposed by the exposure light from the exposure unit, using image data and the information in the storage unit, and to correct the image data by subtracting, from a tone value of each pixel in the image data, a value corresponding to the estimated intensity of the ghost light at a position of a corresponding pixel.

2. The image forming apparatus according to claim 1, wherein the correcting unit is further configured to use a tone value of each of one or more pixels in a predetermined positional relationship with the pixel of interest, and the information, to obtain the intensities of the ghost light produced at the position of the pixel of interest on the photosensitive member, based on light from the light-emitting units corresponding to the one or more pixels, and to estimate the intensity of the ghost light at the position of the pixel of interest as a sum of the obtained intensities of the ghost light.

3. The image forming apparatus according to claim 1, wherein the correcting unit is further configured to estimate the intensity of the ghost light at the position of each pixel on the photosensitive member by obtaining the intensity of the ghost light at the position of each pixel on the photosensitive member based on the information, and by multiplying the obtained intensity of the ghost light at the position of each pixel by a coefficient greater than or equal to zero and less than or equal to one.

4. The image forming apparatus according to claim 1, further comprising a plurality of the correcting units connected in series, wherein a second and subsequent correcting units take data output from the previous correcting unit as an input.

5. The image forming apparatus according to claim 4, wherein, of the plurality of correcting units, a correcting unit in the final stage is further configured to correct the image data by subtracting, from a tone value of each pixel in the image data, a value corresponding to the estimated intensity of the ghost light at a position of a corresponding pixel.

6. The image forming apparatus according to claim 1, further comprising an increase processing unit configured to increase a tone value of each pixel in the image data by a value obtained from the tone value and to take the resulting value as data to be input to the correcting unit.

7. The image forming apparatus according to claim 6, further comprising a changing unit configured to change a developing bias based on an amount of increase in a maximum value or a minimum value for the tone value.

8. The image forming apparatus according to claim 1, wherein the exposure unit is further configured to expose the photosensitive member to form a latent image on the photosensitive member.

9. An image processing apparatus that supplies data for exposure performed by an exposure unit of an image forming apparatus that includes the exposure unit, having a plurality of light-emitting units that correspond to a respective plurality of pixels and a lens array optical system, for emitting exposure light, and a photosensitive member exposed by the exposure light from the exposure unit, the image processing apparatus comprising:
 a storage unit configured to hold information indicating a relationship between (i) light from a light-emitting unit corresponding to a predetermined pixel that is different from a pixel of interest and (ii) ghost light produced at a position of the pixel of interest on the photosensitive member by the exposure light; and
 a correcting unit configured to estimate an intensity of ghost light at a position of each pixel on the photosensitive member in a case when the photosensitive member is exposed by the exposure light from the exposure unit, using the image data and the information in the storage unit, and to correct the image data by subtracting, from a tone value of each pixel in the image data, a value corresponding to the estimated intensity of the ghost light at a position of a corresponding pixel.

10. The image processing apparatus according to claim 9, wherein the exposure unit is further configured to expose the photosensitive member to form a latent image on the photosensitive member.

11. A non-transitory computer-readable storage medium including a program that causes a computer to function as an image processing apparatus that supplies data for exposure performed by an exposure unit of an image forming apparatus, the image forming apparatus including the exposure unit having a plurality of light-emitting units that correspond to a respective plurality of pixels and a lens array optical system, for emitting exposure light, and a photosensitive member exposed by the exposure light from the exposure unit, the image processing apparatus comprising:
 a storage unit configured to hold information indicating a relationship between (i) light from a light-emitting unit corresponding to a predetermined pixel that is different from a pixel of interest and (ii) ghost light produced at a position of the pixel of interest on the photosensitive member by the exposure light; and
 a correcting unit configured to estimate an intensity of ghost light at a position of each pixel on the photosensitive member in a case when the photosensitive member is exposed by the exposure unit, using the image data and the information in the storage unit, and to correct the image data by subtracting, from a tone value of each pixel in the image data, a value corresponding to the estimated intensity of the ghost light at a position of a corresponding pixel.

\* \* \* \* \*